June 13, 1933.  E. M. JAMES  1,913,884
DISPERSION OF SUBSTANCES IN LIQUIDS AND CLARIFICATION
Filed May 23, 1931
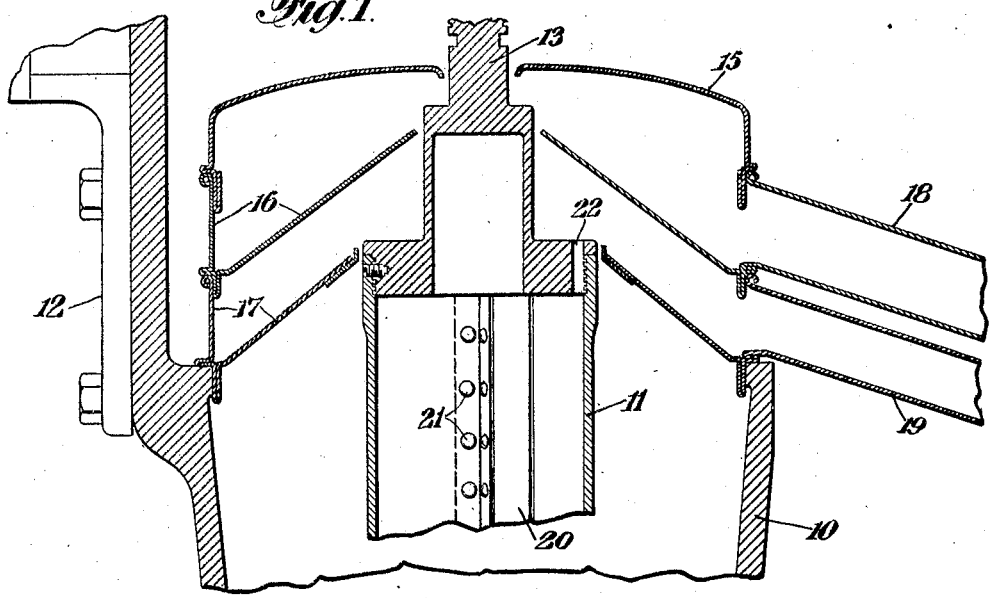
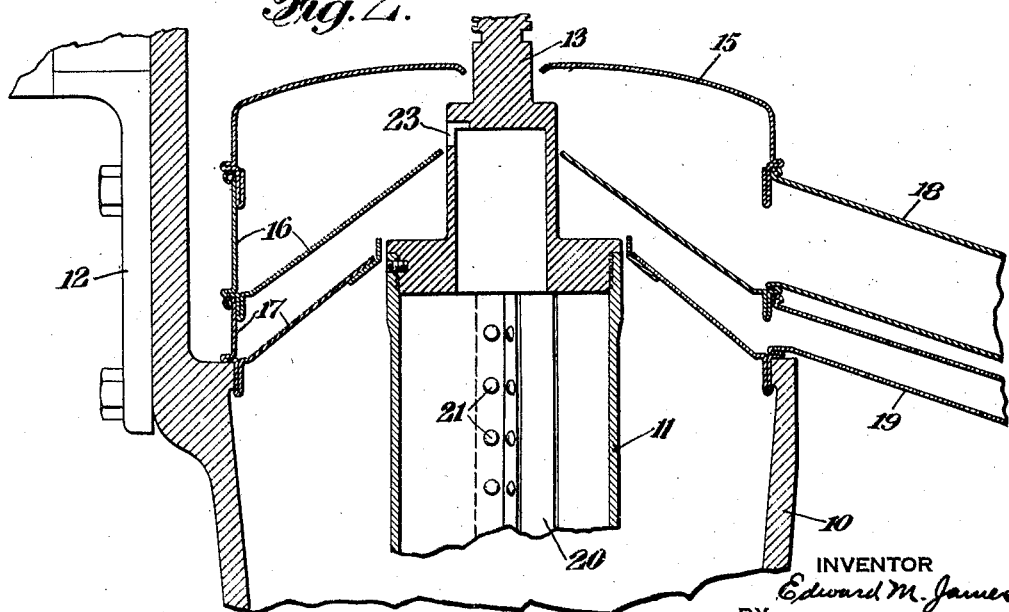
INVENTOR
Edward M. James
BY
Kenyon & Kenyon
ATTORNEYS Patented June 13, 1933

1,913,884

UNITED STATES PATENT OFFICE

EDWARD M. JAMES, OF MOYLAN, PENNSYLVANIA, ASSIGNOR TO THE SHARPLES SPECIALTY COMPANY, OF PHILADELPHIA, PENNSYLVANIA, A CORPORATION OF DELAWARE

DISPERSION OF SUBSTANCES IN LIQUIDS AND CLARIFICATION

Application filed May 23, 1931. Serial No. 539,525.

This invention relates to dispersing substances in liquids and to clarifying liquids and particularly to the dispersion of delustering agents or pigments in viscose in the manufacture of delustered or pigmented rayon.

Heretofore it has been proposed to disperse in viscose, which is to be spun into rayon filaments and threads, a delustering agent for the purpose of reducing the lustre of the resulting filaments and threads. Such agents are immiscible with the viscose and are ineffective or non-uniformly effective unless thoroughly dispersed in viscose. The same conditions obtain with respect to pigments used for imparting color and dyeing characteristics to the final filaments and threads. Mere agitation of a delustering agent or pigment with the viscose does not produce effective dispersion of the agent or pigment in the viscose. While effective dispersion can be brought about by treating the mixture in a homogenizer or a colloid mill, such treatment effects such heating of the viscose as to impair or otherwise undesirably affect the development of those characteristics of the viscose which render it well suited to the spinning operation. Unless agents and pigments which are added to viscose are thoroughly dispersed therein, subsequent filtering operations remove such agents and pigments and the filter operation is impaired. According to this invention the difficulties above mentioned have been overcome and viscose containing highly dispersed solids or highly dispersed liquids, or both, can be obtained without impairing or destroying the development of the viscose to a state in which it possesses characteristics well-suited for spinning. Moreover, removal of the immiscible impurities, which are undesirable by reason either of their size or their character, can be effected in the same operation in which the desirable dispersion of solids or liquids in the viscose is effected. Thus, in accordance with this invention, a mixture of viscose and a pigment may be treated and the final particles of the pigment uniformly and extensively dispersed while the undesirably coarse particles of pigment and any other undesirable solids are removed from the viscose.

In making rayon from cellulose xanthate viscose by methods heretofore known, cellulose such as paper is treated with caustic alkali, e. g., caustic soda solution, which dissolves certain undesirable matter such as hemi-cellulose so that it can be removed by draining and/or pressing. The material which remains is alkali alpha-cellulose (a loose combination of alkali and cellulose) and is suitable for conversion into viscose. The alkali alpha-cellulose is crumbled and shredded thoroughly and aged for any suitable time such as about three days. After ageing it is xanthated by treatment with carbon bisulphide giving cellulose xanthate. The xanthate is then dissolved in caustic solution such as 20% sodium hydroxide, the result being an orange brown viscous liquid containing about 6% to 8.5% of cellulose in the form of cellulose xanthate. This liquid is known as viscose, and more specifically as cellulose xanthate viscose.

The viscose has to be purified as there are many contaminating substances which may be in viscose such as dirt, sand, silicate, rust, old skins of dried viscose, unxanthated fibers, undissolved xanthate, all of which have to be removed before the viscose can be spun. Moreover, it is essential that viscose be aged at a uniform temperature such as 15° to 20° C. for a period varying between 50 and 96 hours. During aging a certain amount of sulphur is precipitated which should be removed prior to spinning.

In order to remove the foreign matter from the viscose, the viscose has heretofore been filtered three times at intervals of about 24 hours during the ageing period. It is now ready for spinning. The spinning is effected by discharging the viscose through fine orifices into a fixing bath of known composition which converts the streams of viscose into rayon filaments. The filaments are combined to form threads which are brought by known treatment into marketable condition.

In the making of delustered or low luster rayon a delustering agent was agitated with the viscose and when the viscose was spun, minute drops of the agent existed on the surface of the rayon filaments, and upon evaporation or other removal thereof the surface of the filament was irregular and the filament was not lustrous. Delustering agents commonly used were hydrocarbon oils, such as kerosene, and fatty oils, such as castor oil. In order that the delustering agent might not be separated from the viscose between the mixing and the spinning, the specific gravity of the agent was increased to that of the relatively high specific gravity of viscose, by the addition of other substances such as organic halides.

Where pigmented rayon was made, a pigment was introduced into the viscose by agitation and became incorporated in the spun rayon filament effecting the purpose desired such as increasing the dyeing index of the rayon or actually giving color thereto. Many substances may be used as pigments in making pigmented rayon. For example, inert pigments such as calcium carbonate, zinc sulphide, titanium oxide and lithophone may be used which are desirable in the finished rayon for improving the dyeing characteristics of the rayon as by increasing the dyeing index thereof. Colored pigments such as prussian blue, may also be used. Any such inert or colored pigments or other similar substances will be referred to herein broadly as pigments.

According to this invention a delustering agent or a pigment or both may be dispersed in viscose by making a very coarse mixture of viscose and delustering agent or pigment or both and then discharging the mixture from a rapidly rotating centrifugal rotor and thereby finely dispersing it. The dispersion of the solid or liquid in the viscose can be assisted by causing the dispersed particles of mixture discharged from the rotor to impact against a solid body, such as the wall of a receptacle into which the mixture is discharged from the rotor. For example, a delustering agent such as kerosene may be coarsely mixed with viscose and the mixture passed through the rotor of a high speed centrifuge and discharged therefrom in the form of finely dispersed particles which strike against the wall of a receiving receptacle.

In the above operation the intense shearing of the liquid, the dispersion of the liquid into fine particles, and the impact on the particles on the wall of the receiving receptacle, are all factors which exert a powerful homogenizing effect, without increasing the temperature of the mixture to a harmful extent. As a result the delustering agent or pigment is more thoroughly and finely dispersed in the viscose, in a state of emulsion or suspension, than has been possible by methods heretofore available.

As before mentioned, viscose has to be clarified during the ageing period to prepare it for spinning. Three successive filtrations have heretofore been regarded as preferable. Filtration wastes viscose absorbed in filter dressings and more viscose is lost in recesses of the filter presses. Moreover, the filter presses require expensive dressings of cotton batting, broadcloth, etc. The used dressings have to be thrown away, and, even if part of the dressing can be reused, expensive laundering for such parts is necessary. Moreover, dressing the presses requires much labor.

According to this invention, by the same operation a delustering agent or pigment can be dispersed in viscose and undesirable solid matter can be removed by the use of a centrifugal machine which is of the clarifier type to be described below. Thus not only can superior dispersion be secured but also removal of undesirable substances can be effected without resort to filtration.

Very fine dispersion of solids or liquids in viscose can be secured according to this invention without deleteriously affecting the temperature of the viscose. The viscose in passing through a centrifuge has been found to be heated only one or two degrees centigrade. By cooling the viscose about two degrees centigrade just prior to introducing it into the centrifuge, the temperature of the viscose can be kept from rising above a chosen limiting temperature and so be kept substantially constant, and well within a permissible temperature range, throughout a long ageing period in which the viscose is centrifugally treated several times at intervals.

While bringing a pigment into a thoroughly dispersed state in viscose according to this invention, the coarse particles can be separated from the viscose and deposited in the centrifugal rotor if a clarifier type of centrifugal machine is used, only the fine particles being dispersed in the viscose. This, of course, is desirable and produces a more uniform filament.

The elimination of filtration of viscose in practicing this invention is particularly advantageous where pigments are used for it is a matter of considerable practical difficulty to filter viscose solutions in which pigment is suspended.

While apparatus which may be used in carrying out this invention is subject to considerable variation, centrifugal machines such as those shown in the accompanying drawing may be used.

Fig. 1 is a sectional elevation of the upper portion of a "miscifier" bowl and cover which may be used according to this invention.

Fig. 2 illustrates a preferred form of apparatus for carrying out this invention and is a sectional elevation of the upper part of a centrifugal machine of the clarifier type.

Referring to both Figs. 1 and 2, a casting 10 surrounds rotor 11 and may be of suitable size and strength to hold the operating parts. A bracket 12 on casting 10 may support any means not shown for rotating rotor 11.

The rotor has at its upper end a neck 13 by which it is suspended for rotation. Encircling the head of rotor 11 are sheet metal receiving receptacles or covers which may be of any construction but, as shown, consist of a lower member 17 fitting into the top of casting 10 and having an upwardly extending side wall from which leads spout 19, intermediate member 16 fitting into the side wall of member 17 and having a side wall from which spout 18 extends, and cover member 15 fitting into the side wall of member 16.

It is preferable in practicing this invention to employ in the centrifugal rotor a so-called "three wing" 20 which may consist of three approximately equally spaced radially extending plates joined to each other by rivets 21. The three wing rotates with the rotor and insures that the liquid in rotor 11 is brought up to the speed of the rotor.

As means for driving and introducing material into centrifugal apparatus such as is herein described is well known and comprises no part of this invention, they have not been shown but may be assumed in connection with the drawing.

Referring to Fig. 1 only, it is seen that the means afforded for discharge of liquid from rotor 11 consists of one or more openings 22 in head of rotor 11, said openings being so formed that the radially-outermost portion of the side-wall thereof is flush with the inside surface of the sidewall of rotor 11. In this type of apparatus no layer of liquid is retained within the rotor and there is no substantial clarification of the liquid.

Referring to Fig. 2 only it is apparent that the means for discharge of liquid from rotor 11 is different from that shown in Fig. 1 and consists in one or more openings 23 which may be positioned in the head of rotor 11. In this type of apparatus foreign material of greater specific gravity than the liquid and of sufficient effective mass will be deposited on the wall of the rotor. Since openings 23 are positioned so as to maintain a fixed radial depth of liquid on the walls of the rotor such deposited matter will remain in the rotor and the liquid will be clarified. Such type of centrifugal apparatus has been referred to herein as the "clarifier" type.

The practice of this invention using the above apparatus may be illustrated specifically in connection with the making of delustered rayon. The viscose solution may be made up as heretofore described. About 1% of a delustering agent such as kerosene may be included in the viscose. It may be stirred in with mild agitation, for example, in the mixing tanks in which the viscose is made up, or in any suitable mixing device.

The viscose, which contains the delustering agent and which is at proper temperature for ageing, may then be passed through a centrifuge at a rate which is subject to wide variation, and the speed of rotation of the centrifuge is subject to wide variation. The benefits of this invention can be secured by passing the viscose through a centrifugal bowl at the rate of about 1,000 lbs. per hour when the rotor is rotating at a speed of about 15,000 R. P. M. and has a length of about 30 inches and an inside diameter of 4⅛ inches. As the liquid may be heated from 1° to 2° C. in passing through the centrifuge it is preferable to cool the viscose about two degrees centigrade prior to treatment therein, so that the viscose will not be heated above the proper ageing temperature.

The liquid is discharged from the centrifuge shown in Fig. 1 through opening 22 and from the centrifuge shown in Fig. 2 through opening 23. Due to the high speed of the rotor the liquid is discharged tangentially at very high speed in the form of dispersed particles. The flying particles strike the wall of the collecting receptacles or covers. In Fig. 1 portion 16 of the cover catches the discharged material and causes it to flow out through spout 19. In Fig. 2 portion 15 of the cover catches the discharged liquid and causes it to flow out through spout 18.

As the liquid is discharged from the bowl the liquid is subjected to a strong mixing action in being powerfully sheared, in being dispersed into fine particles and in striking the collector cover. The result is that the delustering agent in the viscose flowing from centrifugal machine is very minutely and thoroughly dispersed, and, such state of dispersion has been found to be finer and more thorough than that resulting from other mixing devices whose use is practicable with viscose.

Where the apparatus shown in Fig. 2 is used the centrifuging treatment not only disperses delustering agent in the viscose but serves to remove foreign bodies in the viscose. For this reason apparatus of the type shown in Fig. 2 is regarded preferable. Moreover, the device shown in Fig. 2 requires less power and imparts less heat to liquid flowing through it than the apparatus shown in Fig. 1.

If apparatus of the type shown in Fig. 2 is used the centrifugal treatment can be made to take the place of filtration as a means of clarification. If during the ageing of the viscose more than one filtration has been heretofore regarded as preferable, corresponding successive centrifugal treatments may be substituted for the successive filtrations. In addition to the clarifications thus successively obtained, the emulsified state of the delustering agent will be made more and more perfect upon each successive treatment. While centrifugal treatment may be substituted for filtration, it is apparent that it may also be used in connection therewith. For example, the viscose could be subjected to centrifugal treatments and then filtered just before the viscose is spun. In such case the centrifuge would do the bulk of the work of clarification and the filtration would remove any traces of insoluble coarse solids or semi-solids of the same or slightly lower specific gravity than viscose which would have passed through the centrifugal, and would aid in removing any air bubbles that might be present.

As a specific example of results obtainable according to this invention in dispersing a delustering agent in viscose and at the same time clarifying the viscose, a viscose with which had been mixed approximately 1% of kerosene as a delustering agent was centrifuged at a rate of 1,000 lbs. of liquid per hour in a centrifugal machine of the clarifier type having the dimensions and rotating at the speed above mentioned. The insoluble impurities such as sand, iron oxide, and the like hereinabove more fully referred to, were retained in the centrifugal bowl. When the centrifugal effluent was microscopically examined the delustering agent was found to be much more finely dispersed than upon entering the centrifugal.

To disperse a pigment in viscose according to this invention a procedure substantially similar to that above described for dispersing a delustering agent may be followed. Pigments in amounts such as 1% to 0.1% of the viscose can be used. Such pigments are originally distributed throughout the viscose by means of castor oil, dibutylphthalate, etc. If a centrifugal machine of the clarifier type is used not only will foreign particles be removed from the viscose but also undesirable coarse particles of the pigment will be removed. In such case the effective mass of the larger particles of pigment is so great that they are deposited on the side of the rotor. The minute particles of pigment, however, have such small effective mass that they are not deposited in the rotor but are discharged therefrom and are uniformly dispersed through the liquid as already described. As a specific illustration, viscose to which a white inert pigment, for example, finely divided $CaCO_3$, had been added, was passed through the rotor of a centrifugal clarifier, of the type and rotating at the speed above mentioned, at a rate of about 1,000 lbs. per hour. Dirt and minute traces of coarse pigment were retained on the walls of the bowl, and the effluent showed excellent dispersion of the pigment.

In the practice of this invention it is not necessary to increase the specific gravity of the delustering agent by mixing therewith, as above pointed out, another liquid of relatively high specific gravity, and, in fact, the increasing of the specific gravity of the delustering agent to a value greater than the specific gravity of the viscose would tend to cause a loss of delustering agent and the separation thereof from the viscose in the centrifuging operation.

In the specification and claims reference is made to substances which are "insoluble" or "immiscible" in a liquid. It is to be understood, however, that absolute insolubility or immiscibility is not intended and that substances which are partially insoluble or partially immiscible are also included in the terms "insoluble" and "immiscible." Moreover, the term "cover" is to be given a broad interpretation covering any plate, guard, baffle, or other obstruction.

While specific reference has been made to dispersing in viscose delustering agents on the one hand and pigments on the other, it is to be understood that this invention is adapted to dispersing in viscose both delustering agents and pigments. If desired a delustering agent and a pigment can be dispersed in viscose in a single operation merely by mixing both of these substances in viscose and throwing the mixture from a rapidly revolving rotor of a centrifugal as herein described.

That feature of this invention which consists in effecting dispersion in one liquid, of another liquid or of a finally divided solid, or both, by passing the mixture through a centrifuge and discharging it therefrom in such a manner that the desired emulsion or suspension is produced can be effected by the use of a centrifugal machine of the type herein described and it is to be understood that within the spirit of this invention the centrifugal rotor may be provided with known constructional and operational features that promote the dispersion of one constituent in the other constituent of the mixture treated in the rotor.

While specific illustrations of this invention have been given it is to be understood that this has been done for purposes of illustration merely, and that the method and apparatus for practicing same may be considerably modified without departing from the scope of this invention. Moreover, this invention is applicable to the dispersing of insoluble solids or immiscible liquids not only in viscose but also in other liquids.

While I have described features of my invention and certain examples of the application thereof, in considerable detail, it is to be understood that my invention is not limited to such details but that the method and apparatus constituting or embodying my invention may be considerably modified within the spirit of my invention. In this connection it is also to be noted that while I have described my invention in connection with the treatment of cellulose xanthate viscose, it is applicable to the treatment of all other types of viscose for the dispersion of solids and liquids therein, it being especially suitable for the dispersion of delustering agents in cuprammonium viscose and xanthate viscose and for dispersion of pigments in those types of viscose and also in cellulose-nitrate and cellulose-acetate types of viscose; and various features of my invention are capable of general application in connection with substances other than viscose and with liquids and solids other than those above named. For example, my invention comprehends the general application of certain features above described to the dispersing in various liquids of various solid or liquid substances or both which are insoluble therein, especially to the end that such substances may be very thoroughly dispersed and brought to a state of emulsion or suspension. Another feature of my invention which is of general application and not limited to any of the substances above mentioned resides in the dispersion of a solid or liquid or both in a liquid at the same time that the liquid is being clarified by removal of another substance. Another feature of my invention that is of general application is the selective clarification of liquids by the removal of particles having objectionable mass while retaining in a dispersed state particles having a desirable mass. Another feature of my invention which is of general application and utility is that solid and liquid substances can be dispersed in viscous liquids without substantially affecting the temperature of the liquid, this being particularly important in connection with substances which must be maintained at a constant or limited temperature, and cannot be subjected to heat generated in obtaining dispersion by mechanical agitation. A further feature of my invention is that the dispersion of a solid or liquid or both in a liquid may be effected simultaneously with or as a result of the selective clarification of the liquid by removal of certain substances therefrom while leaving certain other substances therein. Thus while the particular advantages of the foregoing features have been set out in detail in connection with the treatment of viscose it is to be understood that the utilization of these features in connection with other substances is within the spirit of my invention.

An advantage resulting from the practice of this invention is that when liquids, such as viscose, containing dispersed insoluble liquid or solid substances are prepared in accordance with this invention for spinning into filaments, the resulting filaments are of superior uniformity in cross-section and surface, and are of superior strength and durability. As heretofore set forth in connection with the spinning of delustered or pigmented cellulose rayon filaments from viscose, for example, an insoluble liquid delustering agent or insoluble pigment is dispersed in the viscose prior to spinning the viscose into filaments. In spinning delustered rayon from viscose containing a dispersed insoluble liquid delustering agent, it has been pointed out that globules of the delustering agent are carried with the viscose as it passes through the orifice of the spinning device and are pressed into the surface of the filament as it is spun. Upon the washing off, evaporation or other removal of the globules from the spun filament, depressions are left in the surface of the filament which produce a delustering effect. Where a delustering agent is only coarsely dispersed in the viscose, coarse globules of the delustering agent are carried into the spun filament during spinning which upon being removed leave large holes or depressions in the filament that greatly reduce the cross section of the filament at such points and make weak spots therein. In some cases it has been found large globules of delustering agent cause the filament to be entirely severed. Moreover, the carrying into the spun filament of irregularly sized globules of delustering agent causes the surface of the filament after removal of the globules to be of variable character and to present a non-uniform appearance. It is therefore a decided advantages in the practice of this invention that a delustering agent can be so finely and uniformly dispersed in viscose, for example, that the delustering agent will adhere to the filament as it is spun only in the form of very minute droplets which, after their removal, leave only very minute depressions in the filament. The result is that the filament spun from viscose, for example, wherein a delustering agent has been finely dispersed according to this invention, has a substantially uniform cross section and does not have weak points therein. Moreover, as the depressions in the resulting filament are very minute and more uniform and numerous, it is possible in the practice of this invention to spin filament which is of superior uniformity of appearance and constancy of surface.

It is likewise of advantage in the practice of this invention that pigmented filaments may be spun which are of superior strength, dyeing characteristic and/or color. Where a pigmented filament is spun from a liquid such as viscose containing irregularly sized pigment particles coarsely dispersed therein, the retention in the spun filament of large pigment particles tends to produce weak points in the spun filament by interrupting the continuity of cross section of the filament substance in which the pigment particles are embedded. Moreover, uneven distribution of irregularly shaped pigment particles produces non-uniform dyeing surface or color in spun filament. Since, in the practice of this invention coarse pigment particles are removed and only very minute and uniformly sized particles are retained in a finely dispersed condition in the liquid from which the filament is spun, the continuity of cross section of the spun filament substance in which the pigment is embedded is substantially uniform and not interrupted and is substantially free from mechanically weak points. Moreover, as the pigment particles are very minute and unformly distributed in filaments spun from liquid treated according to this invention, the points for absorption of dye are increased with resultant improvement in the dyeing index and are more evenly distributed with resultant increase in uniformity of dye receptivity. Likewise where colored pigments are used filaments of superior strength and uniformity of coloration are produced when spun from liquid wherein such pigments have been dispersed according to this invention.

I claim:

1. In the manufacture of rayon, the steps comprising bringing the viscose to suitable temperature for ageing, reducing the temperature of the viscose 1° C. to 3° C., subjecting to the influence of centrifugal force a mixture of an immiscible substance and the viscose at said reduced temperature, and releasing the mixture from the influence of centrifugal force and thereby dispersing the substance in the viscose.

2. In the manufacture of rayon, the steps comprising subjecting a mixture of viscose and a delustering agent and a finely divided pigment to the influence of centrifugal force and thereby removing from the mixture immiscible impurities including undesirably large particles of pigment, and releasing the purified mixture from the influence of centrifugal force and thereby dispersing the agent and the pigment in the viscose.

3. In the manufacture of rayon, the steps comprising subjecting a mixture of viscose and a finely divided pigment to the influence of centrifugal force and thereby removing immiscible impurities including undesirably large particles of pigment from viscose, releasing the purified mixture from the influence of centrifugal force, and impacting the released mixture against a fixed body while the released mixture is moving at high velocity resulting from its release from centrifugal force.

4. In the manufacture of rayon, the steps comprising subjecting to the influence of centrifugal force a mixture of viscose and an immiscible substance, releasing the mixture from the influence of centrifugal force, then ageing the centrifugally treated mixture, subjecting the aged mixture to the influence of centrifugal force, releasing the aged mixture from the influence of centrifugal force, and in one of said centrifugal treatments removing from the mixture by subsidence immiscible impurities and immiscible substances of undesirably large size.

5. In the manufacture of rayon, the step of adding a substance to a viscose solution and the step of intimately mixing the substance with the viscose solution by centrifugal homogenization, the temperature of the solution during the homogenizing operation being maintained within relatively narrow predetermined limits whereby to accurately control the aging conditions and avoid deleterious effects on the viscose incident to the mixing operation.

6. In the manufacture of rayon, the step of adding a substance to a viscose solution and the step of passing the mixture through a rapidly rotating centrifugal bowl and releasing the mixture from said bowl and impacting it against a surface at a high velocity to effect an homogenization thereof, the temperature of the solution during the homogenizing operation being maintained within relatively narrow predetermined limits whereby to accurately control the aging conditions and avoid deleterious effects on the viscose incident to the mixing operation.

In testimony whereof, I have signed my name to this specification.

EDWARD M. JAMES.